United States Patent [19]

Power

[11] Patent Number: 5,583,777

[45] Date of Patent: Dec. 10, 1996

[54] METHOD AND APPARATUS FOR DETERMINING THE WEIGHT AND CENTER OF GRAVITY OF A VEHICLE, PARTICULARLY AN AIRCRAFT

[76] Inventor: Vivian G. Power, 250 Rivermere Avenue, St. Lambert, Quebec, Canada, J4R 2G1

[21] Appl. No.: 177,688

[22] Filed: Jan. 5, 1994

Related U.S. Application Data

[63] Continuation-in-part of Ser. No. 817,040, Jan. 9, 1992, abandoned.

[30]   Foreign Application Priority Data

Jan. 7, 1993 [CA] Canada ................................ 2086891
Jul. 7, 1993 [WO] WIPO ..................... PCT/CA93/00280

[51] Int. Cl.⁶ .................................................... G01M 1/12
[52] U.S. Cl. .......................... 364/463; 364/567; 73/65.01; 177/199
[58] Field of Search ..................................... 364/427, 463, 364/567; 73/65.01, 65.05; 177/126, 127, 134, 163, 201, 202, 211, 199

[56]         References Cited

U.S. PATENT DOCUMENTS

| | | | |
|---|---|---|---|
| 2,735,291 | 2/1956 | Quinn | 73/65 |
| 2,819,612 | 1/1958 | Borgstrom et al. | 73/65 |
| 2,932,188 | 4/1960 | Kennedy | 73/65 |
| 4,502,555 | 3/1985 | Gower | 177/25 |
| 4,639,872 | 1/1987 | McHale et al. | 364/463 |
| 4,659,274 | 4/1987 | France | 414/21 |
| 4,889,202 | 12/1989 | Bron | 177/134 |
| 4,935,885 | 6/1990 | McHale et al. | 364/567 |

FOREIGN PATENT DOCUMENTS

| | | |
|---|---|---|
| 1248628 | 1/1989 | Canada . |
| 0153111 | 8/1985 | European Pat. Off. . |
| WO91/14931 | 10/1991 | WIPO . |

OTHER PUBLICATIONS

Introduction to Photoelectric Sensors, Catalog: Banner Engineering Corporation pp. 12–21 (date unknown).

Modulated Light Source (MLS) Controls Catalog: Micro Switch, A Honeywell Division p. E1 (date unknown).

*Primary Examiner*—Gary Chin
*Attorney, Agent, or Firm*—Fetherstonhaugh & Co.

[57]         ABSTRACT

An apparatus for weighing aircraft, particularly aircraft prior to take-off, the aircraft having differing undercarriage wheel configurations (footprints), one to another, the apparatus for use on or in an aircraft roadway or the like. The apparatus comprises a plurality of spaced apart wheel load measuring devices and wherein at least the wheel load measuring devices for the respective main undercarriage wheels are mounted for lateral movement one to another, and in some cases computer controlled motorized movement controlled from the aircraft, so that they may be selectively positioned in spaced relation one to another to suit the various main undercarriage wheel spacings of the various aircraft to be weighed. A readout means is operatively linked to the load measuring devices in order to display the respective wheel loads registered by the respective load measuring devices. In some cases, a computer is included for calculating the center of gravity of the respective aircraft. In some embodiments the nose wheel load measuring device is also mounted for movement toward and away from the main undercarriage wheel load measuring devices. Further embodiments disclose a rotatable mounting of the load measuring devices including controls therefor to facilitate efficient entry of the aircraft upon the respective load measuring devices. Methods based on operation of the disclosed apparatus are also disclosed.

67 Claims, 3 Drawing Sheets

5,583,777

METHOD AND APPARATUS FOR DETERMINING THE WEIGHT AND CENTER OF GRAVITY OF A VEHICLE, PARTICULARLY AN AIRCRAFT

This is a continuation-in-part of application Ser. No. 07/817,040 filed Jan. 9, 1992 now abandoned.

BACKGROUND OF THE INVENTION (1) Field of the Invention

The present invention relates to methods and apparatus for determining the weight and the location of the center of gravity of a vehicle, particularly aircraft, and particularly aircraft prior to their taking off.

(2) Description of the Prior Art

Methods and apparatus for use in determining the weight and the location of the center of gravity of an aircraft are known. Such include those disclosed in U.S. Pat. No. 4,639,872 dated Jan. 27, 1987 to McHale et al. and U.S. Pat. No. 4,935,885 dated Jun. 19, 1990 to McHale et al. Some embodiments disclosed in the more recent '885 reference require the use of a large number of relatively expensive load measuring means. Furthermore, the embodiments disclosed require aircraft to be weighed, to be considerably maneuvered in order to enter upon the weighing apparatus. Confinement of space may in some cases inhibit such maneuvering to take place or at least make maneuvering of the aircraft difficult.

SUMMARY OF THE INVENTION

It is therefore an important aim of the present invention to provide improved methods and apparatus to those known for use in determining the weight and the location of center of gravity of aircraft and which overcome the aforementioned disadvantages. Further, to address the aforementioned problem of maneuvering.

In one aspect of the present invention there is provided an apparatus for weighing aircraft, including aircraft prior to take off, the aircraft having differing undercarriage wheel configurations one to another, the configurations comprising nose or tail wheel and a pair of spaced apart main undercarriage wheels, the apparatus for use on or within an aircraft roadway, comprising in combination: (a) at least one load measuring device for use in weighing the nose or tail wheel load of the aircraft; (b) at least one pair of spaced apart load measuring devices positioned in spaced relation to the at least one load measuring device, the at least one pair of spaced apart load measuring devices for use in weighing the respective main undercarriage wheel loads of the aircraft, the at least one pair of spaced apart load measuring devices being mounted for movement toward and away from one another in a substantially horizontal plane, whereby they are positioned relatively one to another to receive the respective main undercarriage wheels of the aircraft having differing undercarriage configurations one to another, when the aircraft are moved upon the apparatus for weighing; and (c) an aircraft weight readout device operatively linked to the respective load measuring devices for displaying load data measured thereby upon their receiving and supporting thereon the respective nose or tail and main undercarriage wheels.

In a further aspect of the present invention there is provided a method for determining the weight of aircraft, including ones having differing undercarriage wheel configuration one to another, comprising the steps of: (a) providing an apparatus mounted on or within a roadway for the aircraft, the apparatus having at least one load measuring device for use in weighing the nose or tail wheel load of the aircraft, the apparatus further having at least one pair of spaced apart load measuring devices positioned in spaced relation to the at least one load measuring device, the at least one pair of spaced apart load measuring devices for use in weighing the respective main undercarriage wheel loads of the aircraft, the at least one pair of spaced apart load measuring devices being mounted for movement toward and away from one another in a substantially horizontal plane whereby they are positioned relatively one to another to receive the respective main undercarriage wheels of the aircraft when the respective aircraft are moved upon the apparatus for weighing; (b) moving the at least one pair of spaced apart load measuring devices one to another in the substantially horizontal plane whereby the main undercarriage wheels of the aircraft are aligned therewith for receiving thereon for weighing; and (c) moving the aircraft upon said wheels upon the roadway toward the apparatus and thereafter placing the respective wheels thereof upon the respective load measuring devices or moving them thereover, whereby to permit the weight of the aircraft to be determined.

In a further aspect of the present invention there is provided a method for determining the weight of an aircraft comprising the steps of: (a) moving the aircraft comprising wheels upon a roadway therefor toward an apparatus positioned relative the roadway for weighing the aircraft, the apparatus including a plurality of movably mounted aircraft wheel load measuring devices; and (b) moving the movably mounted aircraft wheel load measuring devices relatively one to another in a substantially horizontal plane whereby to align for reception wheels of the aircraft when the aircraft is moved upon the apparatus; and (c) moving the aircraft upon its wheels upon the roadway toward the apparatus and thereafter placing the respective wheels thereof upon the respective load measuring devices, or moving them thereover, whereby to permit the weight of the aircraft to be determined.

BRIEF DESCRIPTION OF THE DRAWINGS

The invention is illustrated by way of example in the accompanying drawings wherein.

DESCRIPTION OF PREFERRED EMBODIMENTS

Figure 1:
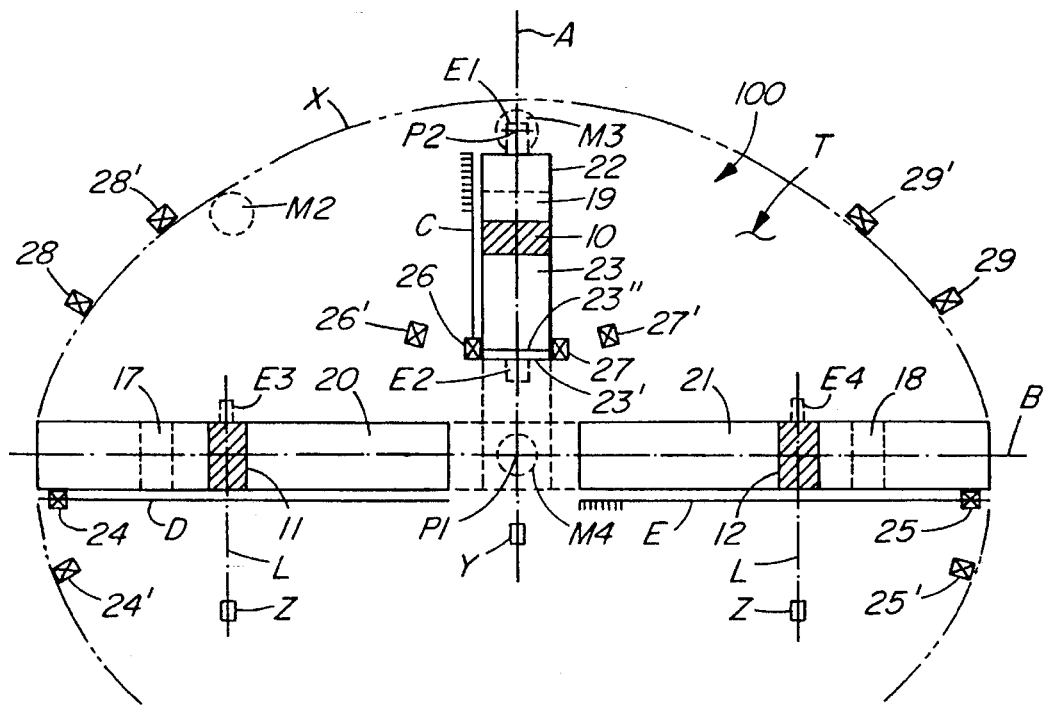
FIG. 1 is a diagrammatic plan view of an apparatus in accordance with the present invention.

Referring to FIG. 1 there is shown an arrangement 100 comprising apparatus for weighing aircraft which comprise differing undercarriage wheel configurations one to another, such configurations comprising nose and/or tail wheels and spaced apart main undercarriage wheels. Apparatus 100, like others disclosed herein, are capable, as well be evident from the description hereinafter, of weighing such aforementioned aircraft regardless of the spacing(s) differences of their undercarriage wheels one to another. Importantly, apparatus 100, like others disclosed herein, may be installed at various locations such as for example an airport gate, taxi way, runway threshold, or within aircraft hangars wherein they will find various uses. Apparatus 100 and others disclosed herein may be conveniently installed upon or within the aircraft roadway or the like using suitable well known means.

Referring again to FIG. 1 there is seen one load measuring means 10 for use in weighing the nose or tail wheel load of an aircraft when placed upon arrangement 100. Spaced from load measuring means 10 are a pair of spaced apart load measuring means 11 and 12 for use in weighing the respective main undercarriage wheel loads of an aircraft. Load measuring means 10, 11 and 12 in the case of arrangement 100 are all mounted for movement respectively one to another. Load measuring means 10 may be selectively moved along axis A toward and away from axis B along which load measuring means 11 and 12 are moved, load measuring means 11 and 12 being movable toward and away from one another whereby to align with and correctly receive the main undercarriage wheels of the aircraft to be weighed. Thus it will be understood load measuring means 11 and 12 are moved apart to suit the spacing between the main undercarriage wheels of the aircraft to be weighed. Likewise, load measuring means 10 is positioned along axis A to suit the spacing between the nose or tail wheel and axis B representing the axis of the main undercarriage wheels of the aircraft to be weighed. All necessary wiring, which may comprise fiberoptics, for the various components, as in the case of other embodiments, may be installed using conventional methods.

Load measuring means 10, 11 and 12, which are of the well known low profile type manufactured for example by General Electrodynamics Corp. of Dallas, Tex., may be mounted for movement in a number of ways. In the case of arrangement 100 they are slidably moved on wheels (not shown) along their respective axes A and B. In the one preferred embodiment arrangement 100, load measuring means 11 and 12 are interconnected to hydraulic means, i.e. to rigidly mounted hydraulic cylinder 13 having a pair of pistons (not shown) whose movable rods 14 and 15 are interconnected respectively to load measuring means 11 and 12. As will be evident rods 14 and 15 are selectively extended from or retracted within cylinder 13 to selectively position load measuring means 11 and 12 respective one another. An alternative hydraulic arrangement is also shown in FIG. 2 utilizing a hydraulic cylinder 16, which may be pivotally mounted to a rigid wall or other structure as shown.

In the case where the nose or tail or spaced main undercarriage wheels each comprise a number of wheels, including bogey wheel arrangements, additional movably mounted load measuring means of the 10, 11 and 12 type may be required. An example of additional load measuring means are represented by the dotted line areas 17, 18 and 19 best seen in FIG. 1. Load measuring means 17, 18 and 19 may for example be interconnected to and moved respectively by a pivotally mounted hydraulic cylinder 16, typically shown in FIG. 2. The terms main undercarriage, nose and tail wheel used in the specification may also refer to for example bogey wheels, i.e. more than one wheel.

Figure 2:
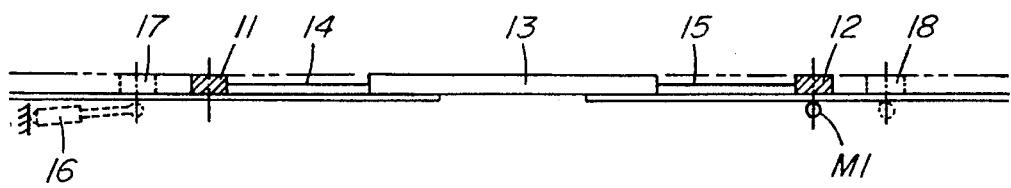
FIG. 2 is a diagrammatic part elevational view of the apparatus shown in FIG. 1 including some additional features.

Alternatively, load measuring means 10, 11, 12, 17, 18 and 19 may be moved along their respective axial paths using alternative hydraulic motor means or suitable electric motor means designated M1 in FIG. 2. The various load measuring means employed may or may not be supported on track-like frame means, an example of which is shown and designated in FIG. 1 by numerals 20, 21 and 22, upon which the aforementioned wheels (not shown) run. Track-like frame means 20, 21 and 22, which comprise rails, may if desired be interconnected one to another as for example shown by dotted lines in FIG. 1. This is particularly convenient where the collective load measuring means of arrangement 100 are to be rotated upon a pivot means, as discussed in detail hereinafter, for such track-like frame means interconnection provides, in some instances, a mounting structure for the pivot means. However, the latter is an optional feature as will be appreciated from the following description.

In the case of the more simple embodiments, the aforementioned load measuring means are manually moved along the respective axes A and B, and to aid correct positioning of the load measuring means one to another for the respective differing undercarriage wheel spacings, a scale means C, D and E may be used. Alternative means for correctly positioning the respective load measuring means, including computer controlled operation, is discussed hereinafter.

As will be understood, the aircraft wheel engaging surface of the respective load measuring means may be flush with the roadway surface accessing the aircraft to arrangement 100 and the others discussed. Alternatively, conventional ramping intermediate said wheel engaging surface and roadway surface may be used, such being convenient in some of the rotatable weighing arrangements. As will be understood, the aforementioned scale means may where convenient be marked in terms of aircraft model numbers rather than applicable dimensional figures, for easy reference.

Attention is again directed to FIG. 1 wherein a non-load measuring means/plate-like means 23 is shown. Plate-like means 23 is linked in tandem arrangement to load measuring means 10 for rolling movement therewith. If necessary, additional plate-like means 23 may be linked to load measuring means 10, i.e. intermediate load measuring means 10 and 19, the purpose of the non-load measuring means being to provide continuity of aircraft wheel support surface with the load measuring means, to avoid the possibility of rolling damage to the aircraft wheels. As will be understood, as load measuring means 10 is moved toward load measuring means 11 and 12, non-load measuring means 23 having edge 23', which preferably comprises wheel ramping means 23", merely slides upon its wheel mounting, and may if necessary pass between track-like frame means 20 and 21. As indicated, load measuring means 11, 12, 17 and 18 may comprise ramping means similar to ramping means 23". The length of non-load measuring means 23 is of course determined by the track length required when load measuring means 10 is positioned at maximum distance away from load measuring means 11, 12, 17 and 18.

Figure 3:
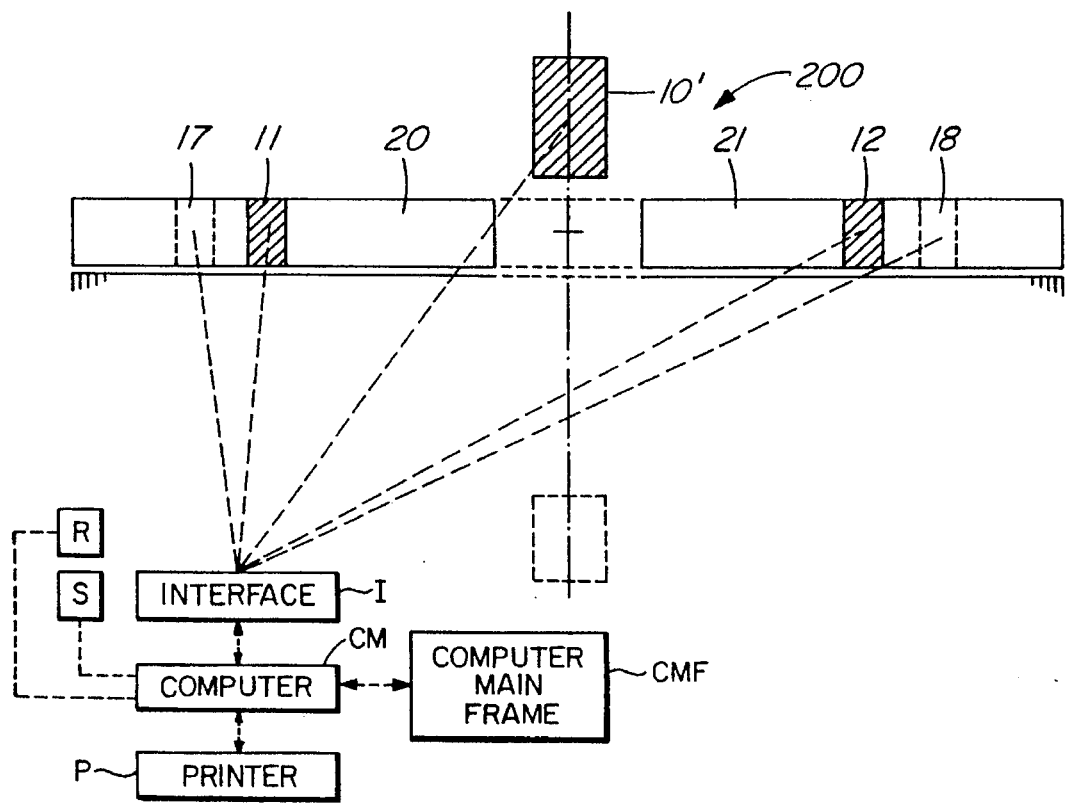
FIG. 3 is a diagrammatic plan view of a further apparatus in accordance with the present invention.

Attention is directed to FIG. 3 and arrangement 200 wherein it will be seen an alternative non-movably mounted load measuring means 10' for the nose or tail wheel is used in conjunction with movably mounted load measuring means 11, 12 and possibly 17 and 18 for the main undercarriage wheels. As will be appreciated, it is optional whether to utilize a non-load measuring means such as item 23 with load measuring means 11, 12, 17 and 18, taking into account the main undercarriage wheels will be received by the prior positioned load measuring means 11, 12, 17 and 18. As will be understood, the use of such non-load measuring means would ensure continuity of wheel rolling surface for other vehicles such as service vehicles passing over arrangements 100 and 200. As may be appreciated, exercising the latter option to use non-load measuring means 23 in the case of embodiments having track-like frame means placed within the roadway will result in more elaborate arrangements in providing continuity of wheel supporting surface. One such more elaborate example would involve the sliding of non-load measuring means 23 just under the aircraft wheel roadway surface.

As indicated previously, track-like frame means 20 and 21 may be interconnected to form a single track for the rolling support of the respective load measuring means 11, 12, 17 and 18. This is represented by the dotted lines shown in FIG. 3.

As also indicated previously, arrangements 100 and 200 may comprise a pivot mounting means for use in rotatably supporting, collectively the various load measuring means. Two examples of such pivotal mountings are shown in FIG. 1. In the first example, track-like frame means 20, 21 and 22 are extended as indicated by the dotted lines to provide attachment for a pivot means P1 which is controllably rotated by motor means M4, which may comprise any suitable known type. Controlled operation of motor means M4 thus controllably rotates load measuring means 10, 11 and 12 (and if present load measuring means 17, 18 and 19) about pivot means P1 to provide or aid aligned paths of reception for the respective nose or tail and main undercarriage wheels of an aircraft approaching arrangements 100 or 200 to be weighed. Pivoting of the weighing apparatus accordingly avoids having to otherwise much maneuver the aircraft in order for it to properly enter upon the apparatus, i.e., its respective wheels are properly received upon load measuring means 10, 11 and 12 (and load measuring means 17, 18 and 19 when required).

In the second example, track-like frame means 20, 21 and 22 are extended as shown by dotted lines in FIG. 1 not to provide a pivot mounting as discussed above but to provide a T-like frame configuration comprising track-like frame means 20, 21 and 22 having the pivot means P2, rotation of which is controlled by motor means M3. Such pivot means permits a pendulum-like movement of the composite load measuring means 10, 11 and 12 (17, 18 and 19). As in the case of the first example, well known caster means (not shown) may be employed to assist rolling support of the plurality of track-like frame means. The benefits of utilizing pivot means P2 are similar to those discussed above with respect to pivot means P1.

A further alternative to the aforediscussed pivoting arrangements is to provide, for an "in-ground" installation, a turntable type mounting wherein portions of the roadway or the like are also rotated about pivot means position P1. The peripheral edge of such a turntable arrangement is indicated by phantom line X in FIG. 1. Controlled rotation of the turntable arrangement may be carried out by motor means, for example motor means M4 or alternatively by motor means M2 located adjacent peripheral edge X, suitably installed using well known gear drive means.

From the foregoing it is seen various pivoting designs of the aircraft weighing apparatus arrangements 100 and 200 may be provided to facilitate efficient entry of the aircraft wheels to be weighed upon the apparatus. As will be evident, in many instances limited rotation of the weighing apparatus is required, i.e., rotation through a selected radial arc. To provide such limited rotation, a pair of stop means may be utilized. Such may be used for both manual or motorized limited rotation of the weighing apparatus arrangements 100 and 200. The stop means may for example comprise abutments 24 and 25 on for example track-like frame means 20 and 21 for engaging respective fixed abutments 24' and 25', when pivot P1 is used. Alternatively, the stop means may comprise abutments 26 and 27 on for example opposing sides of track-like frame means 22 for engaging respective fixed abutments 26' and 27', when pivot P2 is used. Stop means of the type discussed may also be applied to the aforementioned turntable type mounting. Such may comprise abutments 28 and 29 on the turntable T for engaging respective fixed abutments 28' and 29'.

The present invention provides for efficient entry of the aircraft wheels to be weighed upon the apparatus, such comprising electronic beam emitter and receiver means. These elements permit the aircraft to efficiently and correctly maneuvered respective the weighing apparatus, also the weighing apparatus to be efficiently and correctly positioned relative the aircraft to be weighed.

Attention is once again directed to FIG. 1 wherein there is seen a first electronic beam emitter/receiver E1 located on axis A adjacent the terminal end of track-like frame means 22. Spaced therefrom on axis A adjacent the free end of non-load measuring means 23 is a second electronic beam emitter/receiver E2. Further electronic beam emitter/receivers E3 and E4 are seen positioned on the longitudinal center line respectively of load measuring means 11 and 12. The aforementioned respective beam emitters emit linear pencil-like beams for interfacing with transponders or the like on the aircraft to be weighed or alternatively the aforementioned respective beam receivers receive linear pencil-like beams emitted from emitters on the aircraft to be weighed. Operation of the electronic beam devices which may be of any suitable type, including photo electric equipment comprising fiberoptics manufactured for example by Microswitch Division of Honeywell, is described below. Useful references in this art are also provided by Banner Engineering Corporation of Minneapolis, Minn. The term "electronic beam" used in this specification is intended to mean also "light beams" and all similar beam products of the above mentioned firms and their competitors.

Finally, to complete the description of the present aircraft weighing apparatuses, reference is made to FIG. 3 by way of example. As seen load measuring means 10', 11 and 12 are linked operatively to a computer means CM via an interface I. A readout means R (omitted from FIG. 1 for reasons of clarity) is linked operatively to the computer means CM along with a sensor means S in similar manner to that shown for example in aforementioned U.S. Pat. Nos. 4,639,872 and 4,935,885 which are incorporated herein by reference. FIG. 3 it will be seen shows additionally a printer P and a computer mainframe CMF. As will be understood the applicable additional features disclosed and described in the aforementioned patents may be utilized in embodiments of the present invention to enhance their operational abilities.

Figure 4:
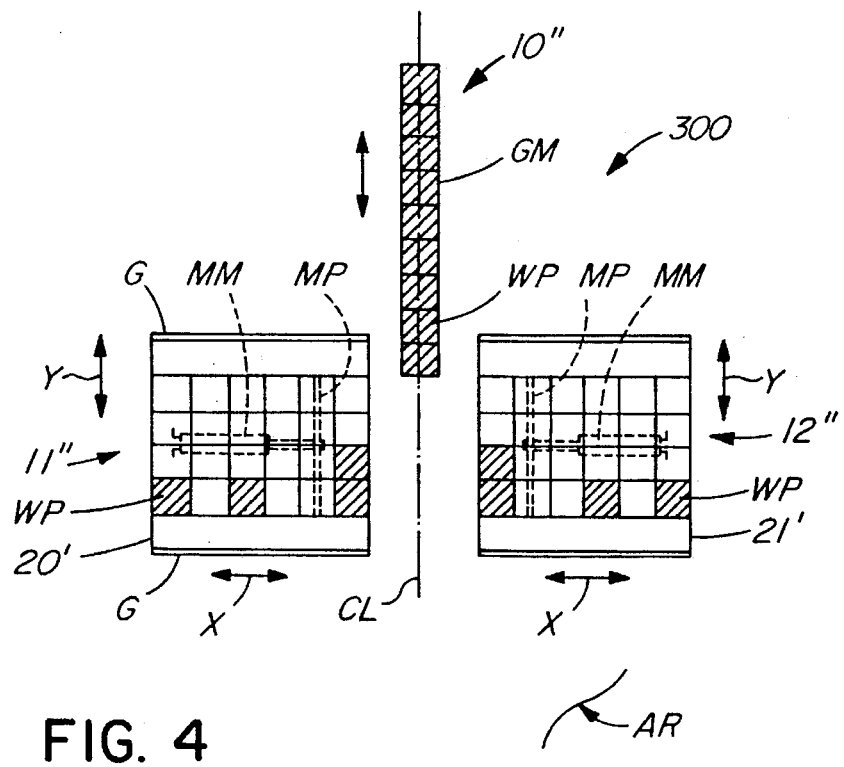
FIG. 4 is a diagrammatic plan view of a further apparatus in accordance with the present invention.

Before going on to describe the operation of the present invention, attention is directed to FIG. 4 showing a further embodiment arrangement 300, such comprising load measuring means 10", 11" and 12". Load measuring means 10", in the case of this particular embodiment example, comprises a plurality of weigh pads WP being of the type disclosed and described in McHale et al U.S. Pat. No. 4,935,885 dated Jun. 19, 1990, the weigh WP being secured within a grid means GM which itself comprises a frame which is rigidly secured to the aircraft roadway AR. Load measuring means 11" and 12" are similar one to another, and again are similar to that disclosed and described in the latter mentioned patent, except that load measuring means 11" and 12" comprising respective grid means 20' and 21' are mounted for sliding controlled movement toward and away from one another upon the aircraft roadway AR. Relative movement of grid means 20' and 21' with roadway AR is effected by a controllable motor means MM comprising for example a hydraulic cylinder shown (in dotted line) located vertically below and beneath respectively grid means 20' and 21'. As will be understood in this particular embodiment, one end of the hydraulic cylinder is pivotally connected to the aircraft roadway AR and the other end of the hydraulic cylinder is pivotally connected to the adjacent grid means.

Accordingly, controlled operation of the respective motor means MM will result in the controlled movement in directions of arrows x of load measuring means 11" and 12" toward and away from one another upon aircraft roadway AR. A guide means G may be provided to assist the linear movement of the respective grid means 20' and 21'. In alternative embodiments, grid means GM may also be mounted for relative sliding movement with aircraft roadway AR utilising a motor means MM (not shown) mounted and operated in similar manner as aforedescribed. As will be understood, controlled movement of grid means GM upon aircraft roadway AR would be linear passing along center line CL whereby grid means GM moves toward or away from grid means 20' and 21'. As will be realized, movement of the respective load measuring means 11" and 12" moves a plurality of weigh pads WP collectively.

Figure 4A:
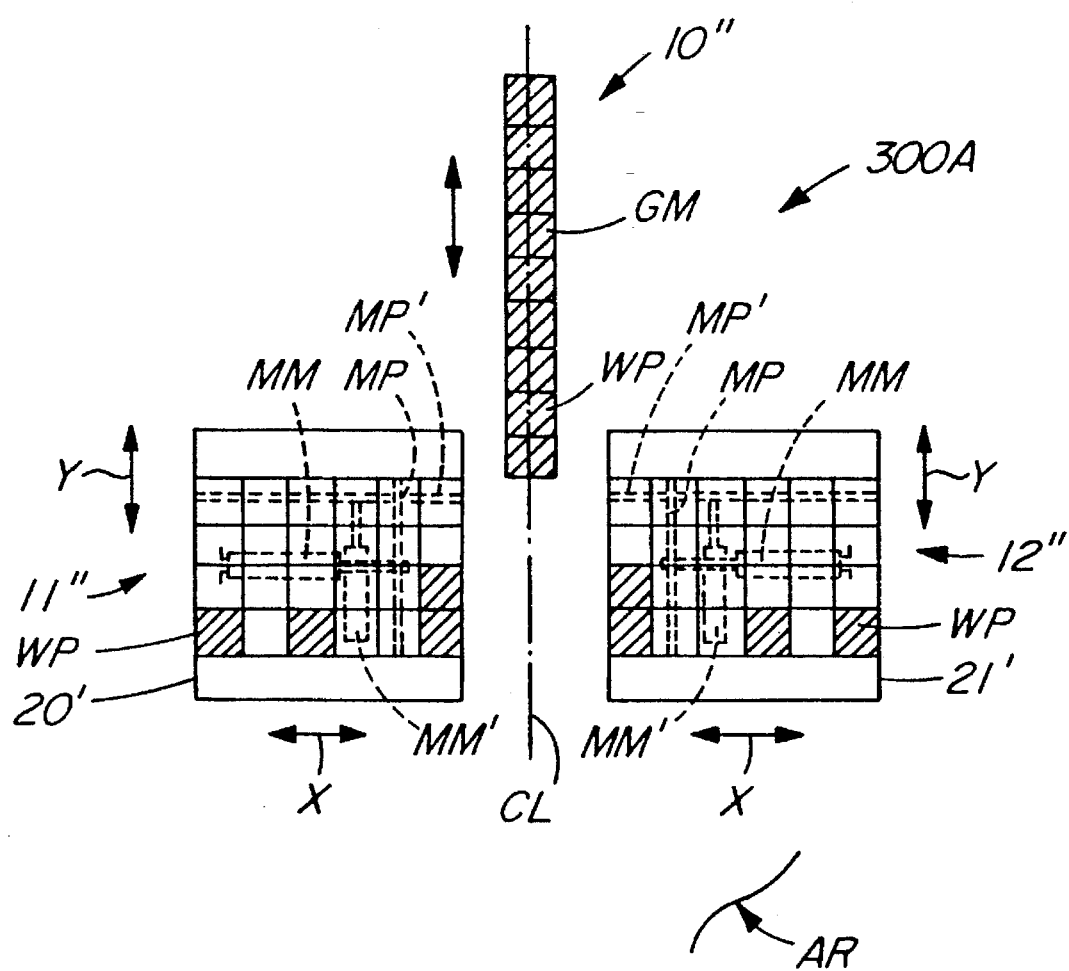
FIG. 4A is a diagrammatic plan view of an apparatus similar to that shown in FIG. 4 except showing additional optional features.

Having reference to FIG. 4A showing arrangement 300A; it shows additional motor means MM' may be mounted (in vertical spaced relation to motor means MM) in the aforedescribed manner to provide controlled linear movement of load measuring means 11" and 12" in the directions of arrows y. To accommodate this double movement of grid means 20' and 21', extended mounting rods MP' are also provided in vertical spaced relation to extended mounting rods MP to permit the necessary "matrix like" sliding of the grid means 20' and 21' relative to aircraft roadway AR. Rods MP and MP', as will be realised, are secured to and form part of the grid means.

Arrangements 300 and 300A provide important advantages over the prior art McHale et al arrangements. Firstly additional aircraft "footprints" are covered without the need to increase the number of weigh pads WP in a given grid means or increase the size, i.e. area of the grid means itself. This is consistent with a stated aim of the present invention. Thus, a relatively small grid means can serve many extended "footprints". This is achieved by controlled sliding movement of the grid means 20' and 21' upon the aircraft roadway AR about the x or y axes or both.

An important feature of the FIG. 4 and FIG. 4A embodiments is that the motor means MM/MM' for moving the respective grid means 20' and 21' upon the aircraft roadway AR, is located there beneath. This ensures a smooth aircraft wheel rolling surface is maintained around the aircraft weigh station at all times.

An important advantage provided by arrangements 300 and 300A and the like is that the weigh pads WP can be controllably moved relative the aircraft wheels to be weighed, thus eliminating the need to reposition the aircraft and its wheels, i.e. for their aligned reception upon the wheel pads WP.

Other embodiments (not shown) may comprise a single motor means interconnecting grid means 20' and 21' in a manner similar to that shown in terms of FIG. 2 interconnecting load measuring means 11 and 12. In such case grid means 20' and 21' could be guided in their controlled movement toward and away from one another upon aircraft roadway AR by guide means G. Again, the single motor means could be positioned below the roadway AR surface and covered with a metal plate or the like to provide an uninterrupted road surface in between the respective grid means.

Other embodiments may comprise an arrangement similar to those shown in FIGS. 4 and 4A wherein grid means 20' and 21' comprise a non-grid frame supporting centrally thereof a single weigh pad WP. The latter weigh pad is accordingly moved about the x or y axes or both to suit various aircraft main undercarriage "footprints". A similar arrangement would result when the center of the grid means 20' and 21' comprises a weigh pad and the remainder of the grid means surrounding the weigh pad comprises non-weighing pads.

Operation of the present invention will now be described.

Referring to FIG. 1, an aircraft to be weighed is moved upon its wheels comprising for example a nose wheel and main undercarriage wheels depicted by letters Y and Z. In this instance the nose wheel Y has been steered along a linear line coincident with axis A and the respective main undercarriage wheels Z have followed linear paths coincident with the respective axes L passing centrally through respectively load measuring means 11 and 12. The latter load measuring means have been prior moved either manually or by motor means along axis B to the position shown in FIG. 1 ready to receive the respective aircraft wheels Z. Nose wheel load measuring means 10 has likewise been moved along axis A in either of the manners discussed above respective load measuring means 11 and 12 ready to receive nose wheel Y. The positioning of the aforementioned load measuring means 10, 11 and 12 has been carried out using either the scale means C, D and E or computer control using a program accessed by the pilot of the aircraft or others (using sensor S in conjunction with a transponder means on the aircraft) from the computer linked to load measuring means 10, 11, 12 (ref. FIG. 3). As will be understood the aforementioned program includes specifications of the aircraft to be weighed, including wheel spacing data.

From the wheel positions indicated in FIG. 1, the wheels are moved to statically rest or dynamically move upon load measuring means 10, 11 and 12 following which the registered wheel loads are shown on readout means R. The center of gravity is subsequently derived using computer CM, and also shown on the readout means R. The registered loads and computed center of gravity data appear on a printout from printer P. Computer mainframe CMF is simultaneously provided with the registered, recorded and calculated data.

In a situation where the aircraft has limited space in which to maneuver, in order to achieve the wheel alignment positions shown in FIG. 1, load measuring means 10, 11 and 12 are rotated about for example pivot means P1 to assist in obtaining such alignment. The rotation about pivot means P1 may be done manually or by controlled motor means, including motor means controlled by electronic beam emitted or received via receivers/emitters E1, E2, E3 and E4, interfacing with similar devices on for example the nose wheel and main undercarriage structures of the aircraft, an example of which will now be described and which incidentally may be applied and adapted for use with the known grid structures disclosed in the aforementioned '885 patent and others.

With the aircraft wheels not aligned as shown in FIG. 1 respective the weighing apparatus, a linear electronic beam is for example transmitted from the nose wheel undercarriage structure of the aircraft to strike receiver E1 (the path of the beam may be maintained in a direction normal to the nose wheel axis). The transmitted beam automatically activates motor means M4 to collectively rotate track-like frame means 19, 20 and 21 carrying load measuring means 10, 11 and 12. With the beam following rotation of E1, rotation continues until the transmitted beam intercepts receiver E2 whereupon motor means M4 is deactivated and rotation ceases. A locking system to prevent rotation may be applied. The nose wheel is then steered along the path of the beam passing coincident with axis A using well known means and the main undercarriage wheels of the aircraft with the aid of selective breaking track to the positions shown in FIG. 1, the aircraft then proceeds to enter upon load measuring means 10, 11 and 12. Linear electronic beams are emitted from the respective main undercarriage wheel structures coincident with axis L respectively to strike receivers E3 and E4 to confirm alignment of the main undercarriage wheels respectively with load measuring means 11 and 12 as shown in FIG. 1.

Motor means M4, like motor means M2 and M3, is a reversible drive type. One instance in which this feature is used is when motor means M4 is activated and drives rotation in a direction opposite to that required for alignment of the aircraft wheels.

In such instance, rotation continues until for example stop means abutment 24 engages abutment 24' at which time motor means M4 is reversed and counter rotation continues until the nose wheel emitted beam strikes receiver E2 to cease rotation and thus provide the desired alignment of the nose wheel with the respective load measuring means.

In the case of for example a gate location, traffic lights may be used to assist the pilot in ensuring the wheels of the aircraft are safely placed on their respective load measuring means. Various other means, including electronic ones may also be used for this task.

From the foregoing it will be evident that in the case where non-rotatable load measuring means are used, i.e., where space limitations do not intrude for maneuvering the aircraft to be weighed, it may be guided whereby to correctly place its wheels on the pre-positioned load measuring means, or move its wheels thereover, using the aforementioned electronic linear beams emitted for example from E2, E3 and E4 interfacing with transponder means or the like on for example the respective nose and main undercarriage wheel support structures, with the wheel paths being guided along respectively axes A and L.

It will be appreciated that the foregoing described operation of activating operation of motor means M4 by electronic beam means to rotate the load measuring means applies in principle to the alternative rotating embodiments, i.e., using motor means M4 or alternatively M2 to rotate the "turntable" type embodiment or using means M3 to rotate the pendulum type embodiment, including use of related abutments mentioned above.

From the foregoing it will be evident arrangements 100 and 200 operate in similar manner in regard to certain aspects.

From the foregoing it will also be evident the various disclosed features may be substituted one for another to provide a multiplicity of preferred embodiments to those shown in arrangements 100, 200 and 300, i.e., to suit not only aircraft of tricycle undercarriage types but also ones of tail wheel types also others having nose and tail wheel undercarriage configurations including for example those used on helicopters.

Regarding operation of arrangement 300, the aircraft is positioned for entry of its wheels upon the respective load weighing means, more specifically the respective weigh pads WP. As indicated, load measuring means 11" and 12" and specifically grid means 20" and 21" comprising the plurality of weigh pads WP can if necessary be moved via operation of the respective motor means MM to thereby align the weigh pads WP with the main undercarriage wheels of the aircraft, the nose wheel for example, having first been positioned to proceed along center line CL. Where no motor means MM is present, the grid means 20' and 21' would be moved manually toward and away from one another. In the case of arrangement 300A, respective motor means MM' are operated to provide further refinement in terms of positioning grid means 20' and 21' respective the aircraft wheel positions. Accordingly, motor means MM and MM' are operated to adjust the weigh pad WP positions if necessary or to position the respective grid means 20' and 21' for differing aircraft "footprints".

Following advancement of the aircraft to place its wheels upon the respective weigh pads, the weighing procedure is carried out in similar manner to that already described.

As indicated previously, other embodiments (not shown) may comprise a rigidly secured to the roadway single motor means, interconnecting grid means 20' and 21' in a manner similar to that shown in FIG. 2 interconnecting load measuring means 11 and 12. Thus, operation of the latter single motor means will move the respective grid means toward or away from one another as required.

Various changes may be made to the embodiments shown herein without departing from the scope of the present invention.

The embodiments of the invention in which an exclusive property or privilege is claimed are defined as follows:

1. An apparatus for weighing aircraft, including aircraft prior to take-off, the aircraft having differing undercarriage wheel configurations one to another, the configurations comprising nose or tail wheel and a pair of spaced apart main undercarriage wheels, the apparatus for use on or within an aircraft roadway, comprising in combination:

(a) at least one load measuring means for use in weighing the nose or tail wheel load of the aircraft;

(b) at least one pair of spaced apart load measuring means positioned in spaced relation to the at least one load measuring means, the at least one pair of spaced apart load measuring means for use in weighing the respective main undercarriage wheel loads of the aircraft, the at least one pair of spaced apart load measuring means being mounted for movement toward and away from one another in a substantially horizontal plane, whereby they are positioned relatively one to another to receive the respective main undercarriage wheels of the aircraft having differing undercarriage configurations one to another, when the aircraft are moved upon the apparatus for weighing; and (c) an aircraft weight readout means operatively linked to the respective load measuring means for displaying load data measured thereby upon their receiving and supporting thereon the respective nose or tail and main undercarriage wheels.

2. An apparatus as defined in claim 1 including controllable motor means for controllably moving said pair of spaced apart load measuring means toward and away from one another.

3. An apparatus as defined in claim 2 wherein said motor means comprises hydraulic motor means.

4. An apparatus as defined in claim 2 wherein said motor means comprises electric motor means.

5. An apparatus as defined in claim 1 wherein the at least one load measuring means for use in weighing the nose or tail wheel load is mounted for movement in a substantially horizontal plane toward or away from the at least one pair of spaced apart load measuring means, whereby the at least one load measuring means is positioned relative the pair of spaced apart load measuring means to receive the nose or tail wheel of the aircraft having differing undercarriage configurations, when the aircraft are moved upon the apparatus for weighing.

6. An apparatus as defined in claim 5 including controllable motor means for controllably moving the at least one load measuring means toward or away from the at least one pair of spaced apart load measuring means.

7. An apparatus as defined in claim 6 wherein said motor means comprises hydraulic motor means.

8. An apparatus as defined in claim 6 wherein said motor means comprises electric motor means.

9. An apparatus as defined in claim 1 wherein the mounting for movement of the respective spaced apart load measuring means comprises track means for supporting and guiding movement of the respective spaced apart load measuring means.

10. An apparatus as defined in claim 5 wherein the mounting for movement of the at least one load measuring means comprises track means for supporting and guiding movement of the at least one load measuring means.

11. An apparatus as defined in claim 1 including scale means for use in positioning the at least one pair of spaced apart load measuring means one to another.

12. An apparatus as defined in claim 5 including scale means for use in positioning the at least one load measuring means relative to the at least one pair of spaced apart load measuring means.

13. An apparatus as defined in claim 9 wherein said track means extends to comprise a single track for supporting and guiding movement of the respective spaced apart load measuring means.

14. An apparatus as defined in claim 10 wherein said track means comprises a single track for supporting and guiding movement of the at least one load measuring means.

15. An apparatus as defined in claim 14 wherein said single track extends to interconnect with a single track for supporting and guiding movement of the respective spaced apart load measuring means.

16. An apparatus as defined in claim 1 wherein the pair of spaced apart load measuring means comprise low profile flat wheel load weighing means.

17. An apparatus as defined in claim 1 wherein the at least one load measuring means comprises low profile flat wheel load weighing means.

18. An apparatus as defined in claim 1 including computer means operatively linked to the respective load measuring means for use in computing said load data.

19. An apparatus as defined in claim 2 including computer means for use in controlling operation of said motor means.

20. An apparatus as defined in claim 6 including computer means for use in controlling operation of said motor means.

21. An apparatus as defined in claim 1 including frame means interconnecting the at least one load measuring means and the at least one pair of spaced apart load measuring means, said frame means being mounted for rotary movement whereby the at least one load measuring means and the at least one pair of spaced apart load measuring means are rotatable relative an adjacently positioned aircraft, permitting alignment of the wheels with the respective load measuring means and the aircraft to be moved upon the apparatus for weighing.

22. An apparatus as defined in claim 21 wherein said frame means comprises pivot means positioned intermediate the at least one pair of spaced apart load measuring means and on an axis passing longitudinally of the at least one load measuring means, for rotation of said frame means.

23. An apparatus as defined in claim 21 wherein said frame means comprises pivot means positioned adjacent an end of the at least one load measuring means remote from the pair of spaced apart load measuring means and on an axis passing longitudinally of said at least one load measuring means for rotation of said frame means.

24. An apparatus as defined in claim 22 including motor means for use in controllably rotating said pivot means.

25. An apparatus as defined in claim 23 including motor means for use in controllably rotating said pivot means.

26. An apparatus as defined in claim 3 wherein said hydraulic motor means comprises hydraulic cylinder means.

27. An apparatus as defined in claim 26 wherein said hydraulic cylinder means is interconnected intermediate the pair of spaced apart load measuring means.

28. An apparatus as defined in claim 1 including electronic beam emitter/receiver means for use in interfacing with electronic beam emitter/receiver means on the aircraft approaching said apparatus to be weighed, whereby to permit alignment of the aircraft with the apparatus for aligned reception of the aircraft wheels to be weighed with the respective load measuring means.

29. An apparatus as defined in claim 21 including electronic beam emitter/receiver means for use in interfacing with electronic beam emitter/receiver means on the aircraft approaching the apparatus to be weighed, whereby to permit said frame means to be moved relative to the aircraft for aligned reception of said aircraft wheels to be weighed with the respective load measuring means.

30. An apparatus as defined in claim 22 including electronic beam emitter/receiver means for use in interfacing with electronic beam emitter/receiver means on the aircraft approaching the apparatus to be weighed, whereby to permit said frame means to be moved relative to the aircraft for aligned reception of the aircraft wheels to be weighed with the respective load measuring means.

31. An apparatus as defined in claim 23 including electronic beam emitter/receiver means for use in interfacing with electronic beam emitter/receiver means on the aircraft approaching the apparatus to be weighed, whereby to permit said frame means to be moved relative to the aircraft for aligned reception of the aircraft wheels to be weighed with the respective load measuring means.

32. An apparatus as defined in claim 1 wherein the at least one pair of spaced apart load measuring means positioned in spaced relation to the at least one load measuring means have non-load measuring means attached thereto for movement therewith.

33. An apparatus as defined in claim 5 wherein the at least one load measuring means has non-load measuring means attached thereto for movement therewith.

34. An apparatus as defined in claim 21 wherein said frame means comprises pivot means for rotatably supporting said frame means together with said respective load measuring means upon said roadway, between a first position and a second position, the apparatus including stop means for limiting rotation of said frame means respective said first and second positions.

35. An apparatus as defined in claim 34 including motor means operatively connected to said frame means for use in rotating said frame means respective said first and second positions, said stop means further controlling operation of said motor means.

36. An apparatus as defined in claim 1 wherein each of the load measuring means comprising the pair of spaced apart load measuring means for use in weighing the respective main undercarriage wheel loads of the aircraft, comprises a grid means and said grid means comprises a plurality of wheel load weighing means.

37. An apparatus as defined in claim 36 including controllable motor means for use in controllably moving said respective grid means relative to the roadway.

38. An apparatus as defined in claim 37 wherein said motor means comprises cylinder means positioned vertically below said respective grid means.

39. An apparatus as defined in claim 37 including controllable motor means for use in controllably moving said respective grid means, relative to the roadway, in parallel spaced relation one to another.

40. An apparatus as defined in claim 39 wherein said motor means comprises cylinder means positioned vertically below said respective grid means.

41. An apparatus as defined in claim 1 wherein each of the load measuring means comprising the pair of spaced apart load measuring means for use in weighing the respective main undercarriage wheel loads of the aircraft comprises a support means for a single wheel load weighing means.

42. An apparatus as defined in claim 41 including motor means for use in controllably moving said respective support means relative to the roadway.

43. An apparatus as defined in claim 42 including motor means for use in controllably moving said respective support means relative to the roadway in parallel spaced relation one to another.

44. An apparatus as defined in claim 1 wherein each of the load measuring means comprising the pair of spaced apart load measuring means for use in weighing the respective main undercarriage wheel loads of said aircraft, comprises a grid means and said grid means comprises a single wheel load weighing means.

45. An apparatus as defined in claim 44 including motor means for use in controllably moving said respective grid means relative to the roadway.

46. A method for determining the weight of aircraft, including ones having differing undercarriage wheel configurations one to another, comprising the steps of:

(a) providing an apparatus mounted on or within a roadway for the aircraft, the apparatus having at least one load measuring means for use in weighing the nose or tail wheel load of the aircraft, the apparatus further having at least one pair of spaced apart load measuring means positioned in spaced relation to said at least one load measuring means, the at least one pair of spaced apart load measuring means for use in weighing the respective main undercarriage wheel loads of the aircraft, the at least one pair of spaced apart load measuring means being mounted for movement toward and away from one another in a substantially horizontal plane whereby they are positioned relatively one to another to receive the respective main undercarriage wheels of the aircraft when the respective aircraft are moved upon the apparatus for weighing;

(b) moving the at least one pair of spaced apart load measuring means one to another in the substantially horizontal plane whereby the main undercarriage wheels of the aircraft are aligned therewith for receiving thereon for weighing; and (c) moving the aircraft upon said wheels upon the roadway toward the apparatus and thereafter placing the respective wheels thereof upon the respective load measuring means or moving them thereover, whereby to permit the weight of the aircraft to be determined.

47. A method as defined in claim 46 including the step of utilizing motor means to move the at least one pair of spaced apart load measuring means one to another.

48. A method as defined in claim 47 including the step of utilizing a computer means to control operation of said motor means to controllably move the at least one pair of spaced apart load measuring means one to another.

49. A method as defined in claim 46 including the step of utilizing a scale means to position the at least one pair of spaced apart load measuring means one to another whereby the main undercarriage wheels of the aircraft are received thereon for weighing.

50. A method as defined in claim 46 including the steps of: providing the at least one load measuring means for use in weighing the nose or tail wheel load of the respective aircraft with mounting means permitting movement of the at least one load measuring means toward and away from the at least one pair of spaced apart load measuring means, whereby the at least one load measuring means is positioned to receive the nose wheel of the aircraft when the aircraft are moved upon the apparatus for weighing and moving the at least one load measuring means relative to the at least one pair of spaced apart load measuring means whereby to position for reception of the nose or tail wheel thereon when the aircraft is moved upon the apparatus for weighing.

51. A method as defined in claim 50 including the step of utilizing motor means to move the at least one load measuring means relative to the at least one pair of spaced apart load measuring means.

52. A method as defined in claim 51 including the step of utilizing a computer means to control operation of said motor means to controllably move the at least one load measuring means.

53. A method as defined in claim 48 including the step of locating said computer means on board the aircraft to be weighed.

54. A method as defined in claim 52 including the step of locating said computer means on board the aircraft to be weighed.

55. A method as defined in claim 48 including the step of programming said computer means with specification/data relating to the aircraft to be weighed and accessing from said computer means said specification/data necessary for use in controlling said operation of said motor means.

56. A method as defined in claim 52 including the step of programming said computer means with specification/data relating to the aircraft to be weighed and accessing from said computer means said specification/data necessary for use in controlling said operation of said motor means.

57. A method for determining the weight of an aircraft comprising the steps of:

(a) moving the aircraft comprising wheels upon a roadway therefor toward an apparatus positioned relative the roadway for weighing the aircraft, the apparatus including a plurality of movably mounted aircraft wheel load measuring means;

(b) moving the movably mounted aircraft wheel load measuring means relatively one to another in a substantially horizontal plane whereby to align for reception wheels of the aircraft when the aircraft is moved upon the apparatus; and (c) moving the aircraft upon said wheels upon the roadway toward the apparatus and thereafter placing the respective wheels thereof upon the respective load measuring means or moving them thereover whereby to permit the weight of the aircraft to be determined.

58. A method as defined in claim 46 including the steps of recording the respective aircraft wheel loads measured by the respective load measuring means and computing the center of gravity of said aircraft utilizing said recorded aircraft wheel loads.

59. A method as defined in claim 46 including the steps of providing and utilizing electronic beam emitter/receiver apparatus to facilitate reception and alignment of the respective aircraft wheels to be weighed with the respective load measuring means.

60. A method as defined in claim 59 including the step of controllably rotating said apparatus upon pivot means mounting the apparatus to the roadway, to further facilitate alignment of the respective aircraft wheels to be weighed with the respective load measuring means.

61. A method as defined in claim 60 wherein the step of controllably rotating occurs generally centrally of the apparatus.

62. A method as defined in claim 60 wherein the step of controllably rotating occurs generally adjacent a peripheral area of the apparatus.

63. A method as defined in claim 57 including the steps of providing and utilizing electronic beam emitter/receiver apparatus to facilitate reception and alignment of the respective aircraft wheels to be weighed with the respective load measuring means.

64. A method as defined in claim 63 including the step of controllably rotating the apparatus upon pivot means mounting the apparatus to the roadway, to further facilitate alignment of the respective aircraft wheels to be weighed with the respective load measuring means.

65. A method as defined in claim 64 wherein the step of controllably rotating occurs generally centrally of the apparatus.

66. A method as defined in claim 64 wherein the step of controllably rotating occurs generally adjacent a peripheral area of the apparatus.

67. A method as defined in claim 57 including the steps of recording the respective aircraft wheel loads measured by the respective load measuring means and computing the center of gravity of the aircraft utilizing said recorded aircraft wheel loads.

\* \* \* \* \*